Patented May 14, 1935

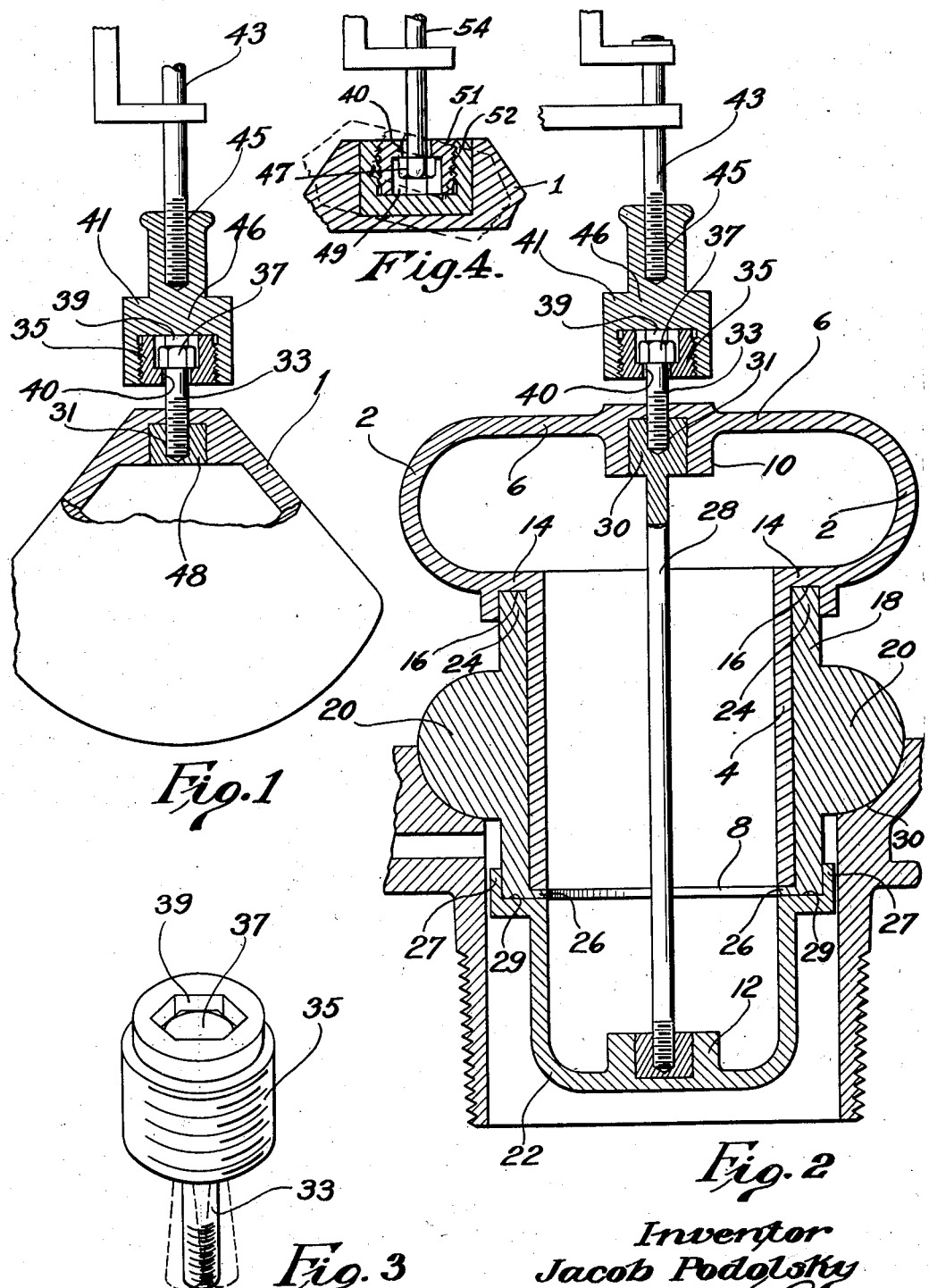

2,001,545

UNITED STATES PATENT OFFICE 2,001,545

VALVE

Jacob Podolsky, Dorchester, Mass.

Application June 20, 1929, Serial No. 372,380

25 Claims. (Cl. 4—56)

The present invention relates to valves, and more particularly to valves for the outlets of flush tanks; also to connections between such valves and the valve stems by which they are carried.

The nature and the objects of the invention will be explained in connection with the accompanying drawing, in which Fig. 1 is a longitudinal section illustrative of the present invention, parts being broken away and other parts in elevation; Fig. 2 is a similar section showing the invention in connection with a modified valve; Fig. 3 is a perspective of a detail; and Fig. 4 is a fragmentary section similar to Fig. 1 of a modification.

The invention is illustrated in Fig. 1 in connection with a valve body 1 of conventional type, and in Fig. 2 in connection with a valve body 2 having a cylindrical portion 4, closed at one end 6, and open at the other end 8. The closed end 6 is provided with a boss 10 projecting centrally therefrom and provided with a rod 28 having an enlarged end 30 seated in the boss 10 and its main portion extending from the boss 10 longitudinally into the cylindrical portion 4, and beyond the lower end of the cylindrical portion 4, as illustrated. The closed end 6 is provided also with a peripheral flange 14 grooved at 16. Mounted upon this body is a valve member having a cylindrical portion 18 contacting with the outer surface of the body cylindrical portion 4, and a valve seat portion 20. The valve member 18, 20 is maintained in position upon the body cylindrical portion 4 by a disc or cup 22 that covers the open, lower end 6 of the body cylindrical portion 4 to form a closed air chamber. To reduce the height of the air chamber, the upper end 6 is made wider than the cylindrical portion 4, as illustrated. One end 24 of the cylindrical portion 18 is seated in the groove 16 and the other end is provided with a terminal flange 26 that engages against the lower end 6 of the portion 4 and is clamped between the said lower end 6 of the portion 4 and the disc or cup 22. The disc or cup 22 is provided with a peripheral flange 27 forming a recess or groove 29 in which is seated the other end of the cylindrical portion 18, with the terminal flange 26. The cup 22 is held in place by means of a boss 12 having a threaded socket 89 in which is threaded the lower end of the rod 28. In this manner, the valve member 18, 20 is maintained snugly in place upon the cylindrical body portion 4. The parts 2 and 22 may be made of any well known product such as hard rubber or some phenol-condensation product, and the parts 28 and 89 may be of metal, with the enlarged end 30 molded into the boss 10, and the threaded socket 89 molded in the boss 12. The outside surfaces of the members 30, 89 may be suitably roughened to hold them in molded position.

The enlarged end 30 is provided with an internally threaded bore 31 into which is threaded a bolt or stem 33 that extends through an externally threaded sleeve 35. The bolt or stem 33 is provided with a polygonal head 37 that seats loosely in a correspondingly polygonal socket or recess 39 in the sleeve 35, the stem 33 passing with a loose fit through an opening 40 in the sleeve 35. The opening 40 is of smaller dimension than the recess 39, though alined therewith. The head 37 fits very loosely or universally in the recess 39 to provide for a degree of sidewise lost motion between the head 37 and the recess 39, as illustrated in dotted and full lines in Figs. 3 and 4, but the polygonal nature of the head and of the walls of the recess causes the parts to be interlocked against substantial relative rotative movement. In this manner, it is possible, by mere rotation of the sleeve 35, to thread the bolt into the bore 31. A cap 41 has an internally threaded socket in which are threaded the external threads of the sleeve 35, and a lifting-rod stem 43 is threaded at its lower end in a threaded bore 45 of the cap 41.

In operation, the lifting rod will lift the valve in the customary manner, and when the lifting rod is released, the valve seat portion 20 will seat against a valve seat 50 of a flush tank. According to the present invention, no strains are set up in the connections between the valve and the lifting rod, this result being effected by the universal connection between the bolt head 37 and the recess 39. The valve is thus enabled to move in any direction,—to the right or left, as will be understood from Fig. 3, or up or down, as will be understood from Figs. 1 and 2,—so as to seat snugly and properly against the valve seat 50. The cap 41 has a partition 46 separating the lifting-rod stem 43 from the bolt 33 to prevent either binding against the other.

The present invention is as applicable to any other kind of valve, typified at 1 in Fig. 1, as to the valve illustrated in Fig. 2. The valve 1 is provided with a metal insert 48 having the internally threaded bore 31, and into which the bolt or stem 33 is threaded, as before described in connection with Fig. 2.

The parts may be modified, as shown in Fig. 4, where the lifting-rod stem 54 is itself provided with the polygonal head 47. The polygonal head 47 is loosely seated in the correspondingly polygonal socket or recess 49 of a sleeve 51 that corresponds in all respects to the sleeve 35, the stem 54 passing with a loose fit through the opening 40 in the sleeve 51. The sleeve 51 is threaded in an internally threaded, metal insert portion 52. Fewer parts are thus employed, though equally good results are obtained.

An advantage of this construction is that it is unnecessary to form the valve body of special shape in order to provide screw threads thereon, the portion 52 serving as an insert, with the screw threads thereon previously provided.

It will be understood that the invention is not restricted to the exact embodiments thereof that are illustrated and described herein, but that further modifications may be made by persons skilled in the art, and all such are considered to fall within the spirit and scope of the present invention as defined in the appended claims.

What is claimed is:

1. A valve having, in combination, two members, one a valve body and the other a lifting rod, one of the members having an internally threaded socket, a threaded sleeve threaded in the socket and having alined openings of different dimensions, and the other member having an enlarged portion in the larger opening, there being a universal connection between the other member and the sleeve, whereby the valve body is permitted universal play to become snugly seated upon a valve seat.

2. A valve having, in combination, a lifting rod having an internally thread socket connected therewith, an externally threaded sleeve threaded in the socket and having alined openings of different dimensions, and a valve body having a portion extending through the smaller opening and an enlarged portion in the larger opening, there being a universal connection between the valve body and the sleeve, whereby the valve body is permitted universal play to become snugly seated upon a valve seat.

3. A valve having, in combination, a valve body having an internally threaded socket, an externally threaded sleeve threaded in the socket and having alined openings of different dimensions, and a lifting rod extending through the smaller opening and having an enlarged portion in the larger opening, there being a universal connection between the lifting rod and the sleeve, whereby the valve body is permitted universal play to become snugly seated upon a valve seat.

4. A valve having, in combination, a valve body, a valve stem detachable from the valve body, a lifting-rod stem, a member joined to the valve stem, and a member joined to the lifting-rod stem, there being a universal connection between one of the stems and the member joined thereto, whereby the valve body is permitted universal play to become snugly seated upon a valve seat.

5. A valve having, in combination, a valve body, a member detachably joined to the valve body, a member universally connected with the first-named member, a member mounted upon the second-named member, and a lifting rod connected with the third-named member, whereby the valve body is permitted universal play relative to the lifting rod so as to become snugly seated upon a valve seat.

6. A valve having, in combination, a valve body, an externally threaded member, a member universally connected with the externally threaded member and joined to the valve body, an internally threaded cap threaded upon the external threads of the externally threaded member, and a lifting rod connected with the cap, whereby the valve body is permitted universal play relative to the lifting rod so as to become snugly seated upon a valve seat.

7. A valve having, in combination, a valve body having a threaded bore, an externally threaded sleeve, a bolt universally connected with the sleeve and threaded in the bore, an internally threaded cap threaded upon the external threads of the sleeve, and a lifting rod connected with the cap, whereby the valve body is permitted universal play relative to the lifting rod so as to become snugly seated upon a valve seat.

8. A valve having, in combination, a valve body having a threaded bore, an externally threaded sleeve having alined openings of different dimensions, a bolt having a head in the larger opening and a stem extending with a loose fit through the smaller opening and threaded in the bore, whereby a universal connection is provided between the bolt and the sleeve, the head of the bolt being interlocked with the walls of the larger opening to prevent substantial rotative movement between the bolt and the sleeve, an internally threaded cap threaded upon the external threads of the sleeve, and a lifting rod connected with the cap, whereby the valve body is permitted universal play relative to the lifting rod so as to become snugly seated upon a valve seat.

9. A valve having, in combination, a valve body having a threaded bore, an externally threaded sleeve having alined openings of different dimensions, the larger opening being polygonal, a bolt having a correspondingly polygonal head in the larger opening to cause the head to interlock with the walls of the larger opening so as to prevent substantial rotative movement between the bolt and the sleeve, the bolt having a stem extending with a loose fit through the smaller opening and threaded in the bore, whereby a universal connection is provided between the bolt and the sleeve, an internally threaded cap threaded upon the external threads of the sleeve, and a lifting rod connected with the cap, whereby the valve body is permitted universal play relative to the lifting rod so as to become snugly seated upon a valve seat.

10. A valve having, in combination, a body having a cylindrical portion closed at one end and open at the other end and having a member projecting through the cylindrical portion from the closed end, the member having a threaded bore at the closed end, the other end of the member projecting just beyond the cylindrical portion and being threaded, a valve member having a cylindrical portion mounted upon the body cylindrical portion and a valve-seat portion, a disc having a threaded socket in which the threaded end of the projecting member is threaded, the disc covering the open end of the body cylindrical portion and engaging an end of the valve-member cylindrical portion to hold the valve member upon the body cylindrical portion, an externally threaded sleeve, a bolt universally connected with the sleeve and threaded in the bore, an internally threaded cap threaded upon the external threads of the sleeve, and a lifting rod connected with the cap, whereby the valve body is permitted universal play relative to the lifting rod so as to become snugly seated upon a valve seat.

11. A flush-tank valve having, in combination, a body having a cylindrical portion closed at one end and open at the other end and having a member projecting through the cylindrical portion from the closed end, the projecting member having a threaded end just beyond the cylindrical portion, the closed end being provided with a grooved peripheral flange, a valve member having a cylindrical portion and a valve-seat portion, one end of the valve-member cylindrical portion being seated in the flange groove, and a disc having a threaded socket in which the end of the projecting member is threaded, the disc covering the open end of the body cylindrical portion and engaging the other end of the valve-member cylindrical portion to hold the valve member upon the body cylindrical portion between the disk and the flange.

12. A valve having, in combination, a body having a cylindrical portion open at one end, a valve member having a cylindrical portion and a valve seat portion, the cylindrical valve portion being mounted upon the body cylindrical portion, the valve member having a terminal flange for engaging the end of the body cylindrical portion, and a closed member closing the open end of the valve-member cylindrical portion with the terminal flange interposed between the said end of the body cylindrical portion and the closed member to produce a closed air chamber in the valve-member body.

13. A valve having, in combination, a body having a member and provided with an internally threaded socket, a valve member mounted upon the body, means cooperating with the first-named member for holding the valve member upon the body, an externally threaded sleeve threaded in the socket and having alined openings of different dimensions, a lifting rod extending through the smaller opening and having an enlarged portion in the larger opening, there being a universal connection between the lifting rod and the sleeve, whereby the valve body is permitted universal play relative to the lifting rod to permit the valve member to become snugly seated upon a valve seat.

14. A valve having, in combination, a valve body, a valve stem, a lifting-rod stem, a member joined to the valve stem, and a member joined to the lifting-rod stem, there being a universal connection between one of the stems and the member joined thereto, whereby the valve body is permitted universal play to become snugly seated upon a valve seat, there being a partition separating the stems.

15. A valve having, in combination, a valve body, an externally threaded member, a member universally connected with the externally threaded member and joined to the valve body, an internally threaded cap threaded upon the external threads of the externally threaded member, and a lifting rod connected with the cap, whereby the valve body is permitted universal play relative to the lifting rod so as to become snugly seated upon a valve seat, the cap having a partition separating the member from the lifting rod.

16. A valve having, in combination, two members, one a valve body and the other a lifting rod, a third member having an opening, a fourth member having a portion loosely mounted in the opening so as to be universally connected with the third member, and a fifth member mounted upon the third member, the two first-named members being respectively connected with the fourth and fifth members, whereby the valve body is permitted universal play relative to the lifting rod so as to become snugly seated upon a valve seat.

17. A valve having, in combination, a non-metal valve body having a metal insert provided with a recess, a cover for the recess, and a lifting rod having a portion extending through the cover and into the recess, the said portion having a universal connection with the insert.

18. A valve having, in combination, two members, one a valve body and the other a lifting rod, one of the members having an internally threaded socket, a threaded sleeve threaded in the socket and having alined openings of different dimensions, and the other member having a stem extending with a loose fit through the smaller opening and having a head in the larger opening to provide a universal connection between the said other member and the sleeve, whereby the valve body is permitted universal play to become snugly seated upon a valve seat, the head being interlocked with the walls of the larger opening to prevent substantial relative movement between the stem and the sleeve.

19. A valve having, in combination, two members, one a valve body and the other a lifting rod, one of the members having an internally threaded socket, an externally threaded sleeve having alined openings of different dimensions, the threaded sleeve being threaded in the socket with the larger opening disposed toward the bottom of the socket and the smaller opening disposed toward the mouth of the socket, and the other member having a portion extending with a loose fit through the smaller opening and an enlarged portion in the larger opening, there being a universal connection between the other member and the sleeve, whereby the valve body is permitted universal play to become snugly seated upon a valve seat 20. A valve having, in combination, a valve body having an internally threaded cylindrical socket, an externally threaded sleeve having alined openings of different dimensions, the threaded sleeve being threaded in the socket with the larger opening disposed toward the bottom of the socket and the smaller opening disposed toward the mouth of the socket, the sleeve being threaded into contact with the said bottom wall, and a lifting rod extending with a loose fit through the smaller opening and having an enlarged portion in the larger opening, there being a universal connection between the lifting rod and the sleeve, whereby the valve body is permitted universal play to become snugly seated upon a valve seat.

21. A valve having, in combination, a valve body, an externally threaded member, a lifting rod universally connected with the externally threaded member, and an internally threaded cap separate from and secured to the valve body and threaded upon the external threads of the externally threaded member, whereby the valve body is permitted universal play relative to the lifting rod so as to become snugly seated upon a valve seat.

22. In combination, an internally threaded member, an externally threaded member threaded in the internally threaded member, one of the members having alined openings of different dimensions, and a member having a stem extending with a loose fit through the smaller opening and a head in the larger opening, the head being interlocked with the walls of the larger opening to prevent substantial relative movement between the stemmed member and the said one member.

23. A valve having, in combination, a member provided with an internally threaded socket, a valve member mounted upon the first-named member, an externally threaded sleeve threaded in the socket and having alined openings of different dimensions, and a lifting rod extending through the smaller opening and having an enlarged portion in the larger opening, there being a universal connection between the lifting rod and the sleeve, whereby the valve member is permitted universal play relative to the lifting rod to permit the valve member to become snugly seated upon a valve seat.

24. A valve having, in combination, a valve body, a lifting rod, a third member having an opening in which the lifting rod is loosely mounted so as to be universally connected with the third member, and a fourth member mounted upon the third member and connected with the valve, whereby the valve body is permitted universal play relative to the lifting rod so as to become snugly seated upon a valve seat.

25. A valve having, in combination, a valve body, a lifting rod, an internally threaded member connected with the valve body, and an externally threaded member threaded in the internally threaded member and having alined openings of different dimensions, the lifting rod extending with a loose fit through the smaller opening and having a head in the larger opening, and the head being interlocked with the walls of the larger opening to prevent substantial relative movement between the bolt and the said one member.

JACOB PODOLSKY.